United States Patent
Moes

(10) Patent No.: US 9,879,610 B2
(45) Date of Patent: Jan. 30, 2018

(54) PNUEMATIC SYSTEM FOR AN AIRCRAFT

(71) Applicant: ROLLS-ROYCE PLC, London (GB)

(72) Inventor: Thierry Moes, Derby (GB)

(73) Assignee: ROLLS-ROYCE plc, London (GB)

( * ) Notice: Subject to any disclaimer, the term of this patent is extended or adjusted under 35 U.S.C. 154(b) by 349 days.

(21) Appl. No.: 14/514,745

(22) Filed: Oct. 15, 2014

(65) Prior Publication Data

US 2015/0121842 A1 May 7, 2015

(30) Foreign Application Priority Data

Nov. 6, 2013 (GB) .................................. 1319563.1

(51) Int. Cl.
*F02C 9/18* (2006.01)
*B64D 13/06* (2006.01)
(Continued)

(52) U.S. Cl.
CPC ................ *F02C 9/18* (2013.01); *B64D 13/04* (2013.01); *B64D 13/06* (2013.01); *B64D 13/08* (2013.01);
(Continued)

(58) Field of Classification Search
CPC ............ B64D 13/04; B64D 2103/0603; B64D 2103/0618; B64D 2103/0648;
(Continued)

(56) References Cited

U.S. PATENT DOCUMENTS 2,923,222 A * 2/1960 Manning ................ B64D 13/08
236/13
4,655,034 A * 4/1987 Kenison .................... F02C 9/18
415/27
(Continued)

FOREIGN PATENT DOCUMENTS

FR 2851295 A1 8/2004
GB 1157962 7/1969

OTHER PUBLICATIONS

Jun. 13, 2014 Search Report issued in United Kingdom Patent Application No. 1319563.1.
(Continued)

*Primary Examiner* — Pascal M Bui Pho
*Assistant Examiner* — Kyle Thomas
(74) *Attorney, Agent, or Firm* — Oliff PLC

(57) ABSTRACT

A pneumatic system 131 for use with gas turbine engines 10 and aircraft 100. The pneumatic system 131 comprises a first engine core compressor bleed offtake in the form of an engine handling bleed offtake 140, and a second engine core compressor bleed offtake in the form of first and second cabin bleed offtake 132, 134, the handling bleed being configured to supply higher pressure air than the cabin offtakes 132, 134. The system 131 comprises a turbocompressor 144 comprising an air compressor 148 driven by a turbine 146. The handling bleed offtake 140 is in fluid communication with the turbocompressor air turbine 146 to thereby drive the air turbine 146, and the cabin bleed offtakes 132, 134 are in fluid communication with the
(Continued)

turbocompressor air compressor 148 such that air from the offtakes 132, 134 is compressed by the turbocompressor air compressor 148.

12 Claims, 6 Drawing Sheets

(51) Int. Cl.
    *F02C 6/08*     (2006.01)
    *B64D 13/04*     (2006.01)
    *B64D 13/08*     (2006.01)
    *F02K 3/075*     (2006.01)

(52) U.S. Cl.
    CPC ............... *F02C 6/08* (2013.01); *F02K 3/075* (2013.01); *B64D 2013/0603* (2013.01); *B64D 2013/0618* (2013.01); *F05D 2260/213* (2013.01); *F05D 2270/101* (2013.01); *Y02T 50/56* (2013.01)

(58) Field of Classification Search
    CPC ......... F05D 2260/213; F05D 2270/101; F05D 2270/301; F05D 2270/312
    See application file for complete search history.

(56) References Cited

U.S. PATENT DOCUMENTS

| | | | | |
|---|---|---|---|---|
| 4,991,389 A | * | 2/1991 | Schafer | F02C 9/18 60/39.24 |
| 5,137,230 A | * | 8/1992 | Coffinberry | B64C 21/06 244/118.5 |
| 5,392,614 A | | 2/1995 | Coffinberry | |
| 5,887,445 A | * | 3/1999 | Murry | B64D 13/06 62/402 |
| 6,257,003 B1 | * | 7/2001 | Hipsky | B64D 13/06 62/402 |
| 2007/0137214 A1 | * | 6/2007 | Zewde | F02C 9/18 60/782 |
| 2008/0110193 A1 | * | 5/2008 | Jonqueres | B64D 13/06 62/331 |
| 2010/0107594 A1 | | 5/2010 | Coffinberry et al. | |
| 2013/0164115 A1 | * | 6/2013 | Sennoun | F02C 7/185 415/1 |
| 2013/0174573 A1 | | 7/2013 | Hipsky et al. | |
| 2013/0187007 A1 | * | 7/2013 | Mackin | F02C 6/08 244/134 R |
| 2014/0165583 A1 | * | 6/2014 | Oliverio | F02C 9/18 60/776 |
| 2014/0250898 A1 | * | 9/2014 | Mackin | F02C 6/08 60/772 |

OTHER PUBLICATIONS

Mar. 19, 2015 European Search Report issued in European Patent Application No. EP 14 18 8725.

* cited by examiner

PNUEMATIC SYSTEM FOR AN AIRCRAFT

FIELD OF THE INVENTION

The present invention relates to a pneumatic system for an aircraft.

BACKGROUND TO THE INVENTION

FIG. 1 shows a gas turbine engine 10. Gas turbine engines 10 are mounted on an aircraft 100 in pairs, as shown in FIG. 2. The engine 10 comprises, in axial flow series, an air intake duct 11, an intake fan 12, a bypass duct 13, an intermediate pressure compressor 14, a high pressure compressor 16, a combustor 18, a high pressure turbine 20, an intermediate pressure turbine 22, a low pressure turbine 24 and an exhaust nozzle 25. The fan 12, compressors 14, 16 and turbines 20, 22, 24 all rotate about the major axis of the gas turbine engine 10 and so define the axial direction of gas turbine engine.

Air is drawn through the air intake duct 11 by the intake fan 12 where it is accelerated. A significant portion of the airflow is discharged through the bypass duct 13 generating a corresponding portion of the engine 10 thrust. The remainder is drawn through the intermediate pressure compressor 14 into what is termed the core of the engine 10 where the air is compressed. A further stage of compression takes place in the high pressure compressor 16 before the air is mixed with fuel and burned in the combustor 18. The resulting hot working fluid is discharged through the high pressure turbine 20, the intermediate pressure turbine 22 and the low pressure turbine 24 in series, where work is extracted from the working fluid. The work extracted drives the intake fan 12, the intermediate pressure compressor 14 and the high pressure compressor 16 via shafts 26, 28, 30. The working fluid, which has reduced in pressure and temperature, is then expelled through the exhaust nozzle 25 and generates the remaining portion of the engine 10 thrust.

FIG. 2 shows an aircraft 100 by powered by a pair of gas turbine engines 10. The aircraft 100 comprises an aircraft pneumatic system comprising an environmental control system (ECS) powered by high pressure air provided by a bleed air system (BAS). Bleed air systems generally comprise cabin bleed offtakes 32, 34 which duct air from the compressor 14, 16 for use in the aircraft pneumatic system, such as the (ECS) and wing de-icing. The ECS provides cabin air to the cabin interior at a required temperature, pressure and flow rate. The BAS system comprises a fan air heat exchanger 36 which exchanges heat between relatively cool fan air provided by a fan air duct 38, and the relatively hot cabin bleed air provided from the ports 32, 34. Once cooled by the heat exchanger 36, the cabin bleed air is then passed to an air cycle machine (not shown), where the cabin bleed air is processed to obtain the desired heat, pressure and flow rate, before being passed to the cabin of the aircraft 100.

In the prior example shown in FIG. 3, low pressure and high pressure cabin bleed offtakes 32, 34 are provided. It is generally desirable to extract bleed air from the low pressure bleed offtake 32 (i.e. one near the front of the engine), since air taken from the low pressure bleed offtake 32 has been compressed to a lesser extent compared to air taken from the high pressure bleed offtake 34. Consequently, a given mass of air bled from the low pressure bleed offtake 32 represents a smaller energy loss to the thermodynamic cycle of the engine 10 compared to the same mass of air taken from the high pressure bleed offtake 34, and so the specific fuel consumption (SFC) of the engine 10 will be greater (i.e. more fuel will be burned for a given thrust) where air is bled from the high pressure bleed offtake 34.

The pneumatic system of the aircraft 100 further comprises one or more engine core compressor handling bleed offtakes 40. The handling bleed offtake 40 is operated by an engine controller (FADEC 42), which opens and closes the handling bleed offtakes 40 on a predetermined schedule to ensure that the respective core compressor 14, 16 does not stall or surge during operation. An outlet of the offtake 40 communicates with a low pressure area, such as the bypass duct 13, such that flow from the bleed offtake 40 can be dumped overboard. In general, a core compressor handling bleed offtake is provided at a high pressure compression stage of each core compressor 14, 16.

However, current systems are non-optimal, in the sense that relatively high pressure cabin bleed air must be used to provide sufficient pressure and flow to the ECS at some engine conditions, such as when the engine is at low power. Consequently, at least one of the cabin bleed offtakes 32, 34 must be located at a relatively high pressure stage of the engine compressor 14, 16, and must be utilised extensively during engine operations, particularly when the engine is operated at low thrust, and therefore low engine overall pressure. Such arrangements are relatively complex, and may result in excessive thrust specific fuel consumption (SFC), since the cabin bleed air must be provided at relatively high pressure in such prior arrangements. In some cases, the minimum thrust that can be achieved by the engine in flight (known as "flight idle thrust") is limited by the overall pressure ratio required to operate the ECS system. Consequently, in such circumstances, the engines 10 are operated at a higher thrust than would be required for maintaining the desired flight profile and engine operability alone, thereby again resulting in increased SFC. A further disadvantage of current systems, is that the high pressure handling bleed air is simply vented to the bypass duct, and therefore largely lost to the thermodynamic cycle of the engine, save for a small amount of thrust generated by the bleed air.

In an unrelated problem, aircraft gas turbine engines are a major source of aircraft noise. There is a continued effort to reduce aircraft noise, particularly during the take-off, approach and landing phases of flight. A major source of engine noise during low power operation of a gas turbine engine (i.e. during approach and landing) is the efflux from the handling bleed valve. The high levels of noise are thought to be caused by the high pressure, high temperature air turbulently mixing in the engine bypass flow.

The present invention describes an aircraft pneumatic system and a method of operating an aircraft pneumatic system which seeks to overcome some or all of the above problems.

SUMMARY OF THE INVENTION

According to a first aspect of the present invention, there is provided a pneumatic system for an aircraft, the aircraft having a gas turbine engine, the gas turbine engine comprising one or more core compressors and a bypass fan, the pneumatic system comprising:

first and second core compressor bleed offtakes configured to respectively provide bleed flows from the gas turbine core compressor; and a turbocompressor comprising an air compressor mechanically driven by an air turbine; wherein the first core compressor bleed offtake is in fluid communication with the turbocompressor air turbine to thereby drive the air turbine, and the second core compressor bleed offtake is in fluid communication with the turbocompressor air compressor such that air from the second core compressor bleed offtake is compressed by the turbocompressor air compressor.

Accordingly, the invention provides a pneumatic system for an aircraft in which energy from an offtake that would normally be wasted is used to provide additional compression for a lower pressure core engine offtake. Consequently, the lower pressure engine offtake air may be taken from a lower pressure stage of the compressor compared to prior arrangements, thereby reducing the energy required to compress the lower pressure offtake air, thereby resulting in decreased engine SFC. Furthermore, the addition of a turbine downstream of the high pressure engine core offtake reduces the pressure and temperature of the air dumped overboard. This in turn provides the advantage of reducing stressing of the exhaust structure, and also reducing noise from the handling bleed valves in view of the lower temperature and pressure exhaust efflux.

The first core compressor offtake may provide a relatively high pressure bleed flow, and the second core compressor offtake may provide a relatively low pressure bleed flow. In any event, the system must be configured such that energy provided by the first core compressor bleed flow flowing through the turbine provides sufficient energy to pressurise the second compressor offtake bleed flow flowing through the turbocompressor air compressor. For example, the pressure drop across and/or mass flow through the turbine in use is greater than the pressure rise across and/or mass flow through the compressor.

The first core compressor offtake may comprise an engine handling bleed offtake. The first core compressor offtake may comprise an outlet downstream of the turbocompressor air turbine. The outlet may communicate with a low pressure sink such as a fan bypass duct. The outlet of the first core compressor may directly communicate with the low pressure sink independently of the outlet of the second core compressor. Advantageously, flow through the first core compressor can still be controlled independently of flow through the second core compressor. This is particularly beneficial where the first core compressor offtake comprises a handling bleed.

Alternatively, the outlet of the first and second core compressors may be combined downstream of the turbocompressor.

The second core compressor offtake may comprise a cabin bleed offtake. The second core compressor offtake may be in fluid communication with an aircraft environmental control system downstream of the turbocompressor air compressor. The pneumatic system may comprise a plurality of second core compressor offtakes. For example, the pneumatic system may comprise a high pressure cabin bleed offtake in fluid communication with a relatively high pressure core compressor stage of the gas turbine engine, and a low pressure cabin bleed offtake in fluid communication with a relatively low pressure core compressor stage of the gas turbine engine. Advantageously, the engine handling bleed, which is normally "dumped overboard" (i.e. the gas flows into a low pressure sink such as the bypass duct), can be used to increase the pressure of the cabin bleed, thereby reducing the pressure required at the inlet of the cabin bleed offtake while still providing the necessary pressure, temperature and flow rate to operate the ECS.

The or each core compressor offtake may comprise a modulation valve configured to control air flow and or air pressure provided by the respective offtake. The modulation valve may be configured to be operable in a closed position, in which flow from the respective offtake is substantially stopped, and an open position, in which flow is permitted from the respective offtake. One or more of the modulation valves may be operable in further positions between the open and closed positions, such that the flow rate and/or pressure of the respective offtake can be continuously controlled.

The pneumatic system may comprise a compressor bypass arrangement configured to selectively bypass second core compressor offtake air around the turbocompressor air compressor, which bypass arrangement may comprise a bypass valve.

Advantageously, the system provides further operability by allowing the compressor to be selectively bypassed, thereby providing additional control over the cabin bleed offtake pressure.

The gas turbine engine may comprise at least first and second compressor spools, and may comprise three compressor spools.

The second core compressor offtake may communicate with a first fan air heat exchanger, which may be located downstream of the turbocompressor air compressor. The second core compressor offtake may communicate with a second fan air heat exchanger, which may be located upstream of the turbocompressor air compressor.

The pneumatic system may further comprise a core compressor offtake heat exchanger configured to exchange heat between the first and second core compressor offtake flows. The core compressor offtake heat exchanger may be located downstream of the turbocompressor air compressor and air turbine. Advantageously, the gas temperatures of the cabin offtake and engine handling offtake flows can be somewhat normalised. Consequently, the temperature of the cabin bleed air can be lowered before being passed to the ECS, thereby potentially decreasing the amount of cooling required in the ECS.

According to a second aspect of the present invention there is provided a method of operating a pneumatic system in accordance with the first aspect of the invention.

Where the second compressor bleed offtake comprises a high pressure cabin bleed offtake and a low pressure cabin bleed offtake, the method may comprise determining whether the low pressure cabin bleed pressure is above a predetermined value and, where the low pressure cabin bleed pressure is above the predetermined value, operating the respective modulation valves to open the low pressure cabin bleed offtake and close the high pressure bleed offtake.

Where the pneumatic system comprises a compressor bypass arrangement configured to selectively bypass second core compressor offtake air around the turbocompressor air compressor, the first compressor bleed offtake comprises an engine handling bleed offtake, and the second compressor bleed offtake comprises a cabin air bleed offtake, the method may comprise determining whether the cabin air bleed pressure is above a predetermined value and, where the cabin air bleed offtake pressure is above the predetermined value, operating the compressor bypass arrangement to bypass the cabin air bleed flow around the turbocompressor air compressor, and where the cabin air bleed offtake pressure is not above the predetermined value, operating the compressor bypass arrangement to pass cabin air bleed flow through the turbocompressor air compressor. Advantageously, the method of operating the pneumatic system ensures that, where the pressure from the second compressor offtake is sufficient, the turbocompressor is not operated. By bypassing the second offtake around the turbocompressor air compressor, a pressure loss from the non-operational turbocompressor air compressor is avoided.

Where the second core compressor bleed offtake pressure is determined not to be above the predetermined value, the method may comprise determining whether the engine handling modulation valve is open and, where the engine handling modulation valve is determined to be open, operating the respective valves to open the high pressure cabin bleed offtake, and where the engine handling modulation valve is determined to be closed, operating the respective valve to open the high pressure cabin bleed offtake and operating the respective valve to open the handling bleed offtake.

Where the handling bleed modulation valve is operable in further positions between the open and closed positions, the method may comprise determining a cabin bleed offtake pressure, and, where the cabin bleed offtake pressure is above a predetermined value, operating the respective valve to open the cabin bleed offtake and, where the cabin bleed offtake pressure is below the predetermined value, operating the handling bleed modulation valve such that the cabin bleed flow pressure downstream of the turbocompressor air compressor is above the predetermined value. Advantageously, where the cabin bleed flow pressure downstream of the compressor is insufficient (i.e. below the predetermined value), the system can operate the handling bleed valve to drive the turbine of the turbocompressor, thereby driving the air compressor of the turbocompressor to increase the cabin bleed flow pressure downstream of the turbocompressor air compressor until the pressure reaches the predetermined value. Consequently, the invention ensures that the pressure provided downstream of the turbocompressor air compressor is above the required value during a relatively wide range of operating conditions, without the requirement for operating a higher pressure cabin bleed flow, which might otherwise result in increased SFC.

According to a third aspect of the invention there is provided an aircraft comprising the pneumatic system of the first aspect of the invention.

DETAILED DESCRIPTION

Figure 1:
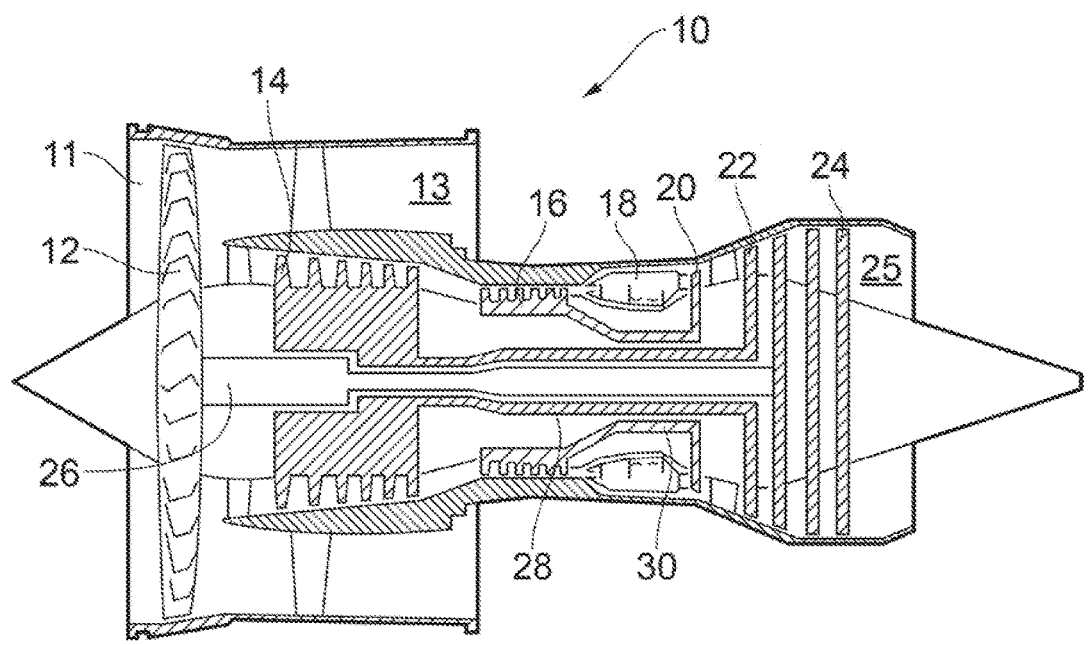
FIG. 1 shows a schematic cross sectional view of a gas turbine engine.
Figure 2:
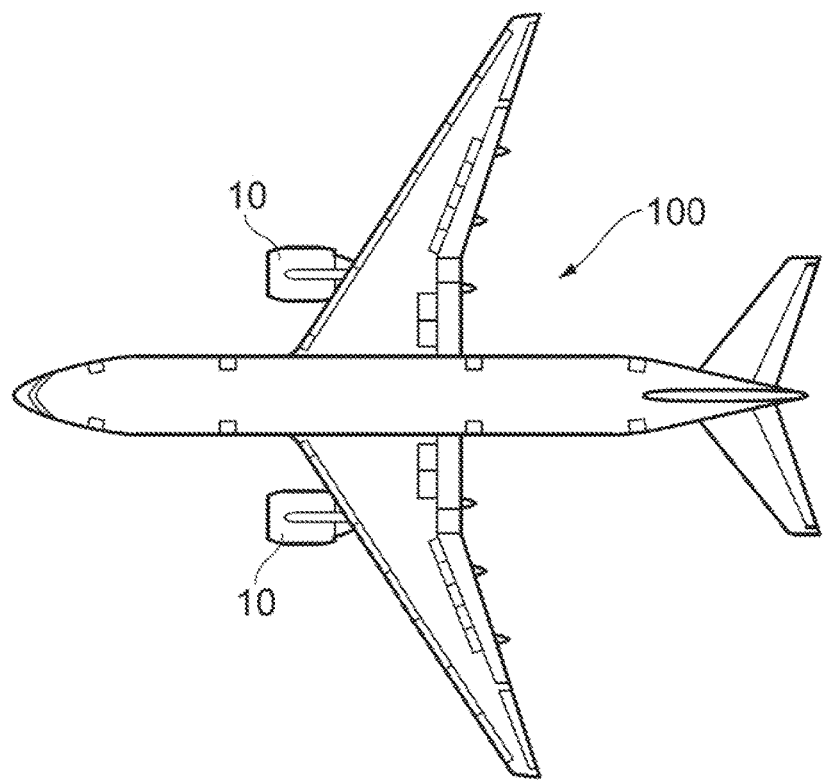
FIG. 2 shows a schematic overhead view of an aircraft.
Figure 3:
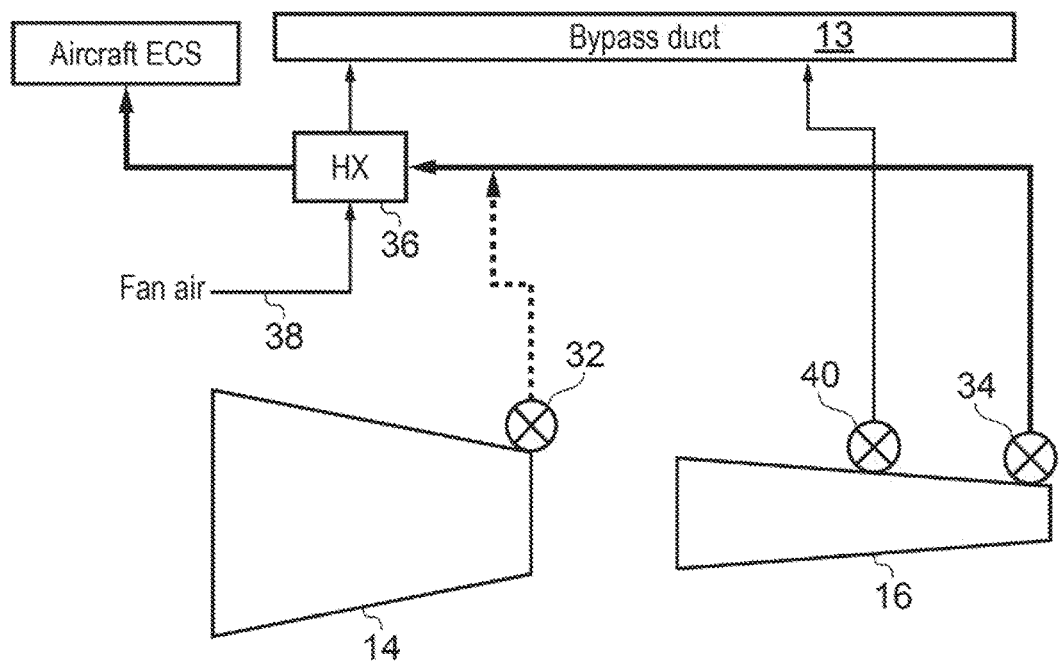
FIG. 3 shows a schematic arrangement of a prior pneumatic system of an aircraft.

FIG. 1 shows a gas turbine engine 10. Gas turbine engines 10 are mounted on an aircraft 100 in pairs, as shown in FIG. 2. The engine 10 comprises, in axial flow series, an air intake duct 11, an intake fan 12, a bypass duct 13, an intermediate pressure (IP) compressor 14, a high pressure (HP) compressor 16, a combustor 18, a high pressure turbine 20, an intermediate pressure turbine 22, a low pressure turbine 24 and an exhaust nozzle 25. The fan 12, compressors 14, 16 and turbines 20, 22, 24 all rotate about the major axis of the gas turbine engine 10 and so define the axial direction of gas turbine engine.

Figure 4:
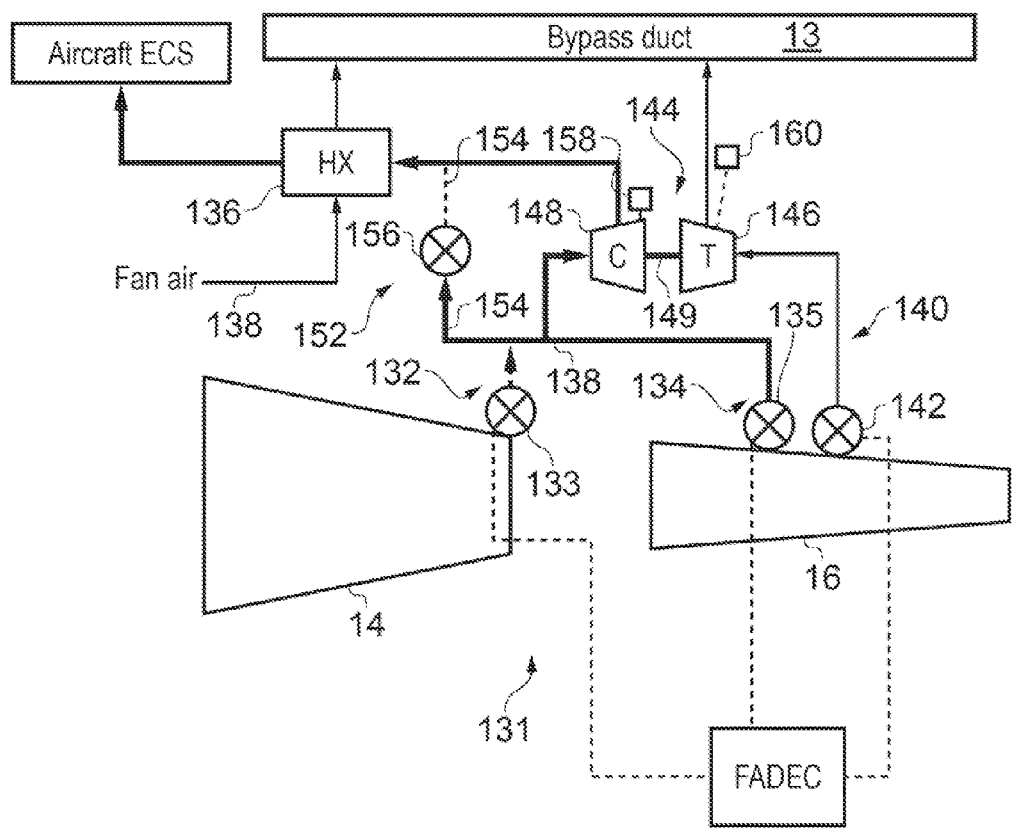
FIG. 4 shows a first pneumatic system in accordance with the present invention.

FIG. 4 shows a pneumatic system 131 for use with the gas turbine engines 10 and aircraft 100. The pneumatic system 131 comprises at least one first engine core compressor bleed offtake in the form of an engine handling bleed offtake 140. An intake of the offtake 140 is in fluid communication with a relatively high pressure main engine compressor stage such as a compressor stage of the of the high pressure compressor 16, and an outlet is in fluid communication with a relatively low pressure sink such as the bypass duct 13. In general, a plurality of handling bleed offtakes are provided at different compressor stages, and in some cases, a plurality of bleed valves are provided for each offtake. For example, in one known prior gas turbine engine, there is a handling bleed offtake at IP8 (i.e. the eighth stage of the IP compressor 14) comprising three bleed valves, and a further handling bleed offtake at HP3 (i.e. the third stage of the HP compressor 16). In other embodiments, the offtake 140 could be in fluid communication with other compressor stages. The offtake 140 is controlled by an engine controller (FADEC 50) via a valve 142. The valve 142 is capable of controlling flow rates and/or pressure from the offtake 140 downstream of the valve 142, and is capable of operating in at least a closed position, in which flow from through the offtake 140 is substantially stopped, and an open condition in which flow through the offtake 140 is substantially permitted, i.e. in which air flows through the offtake 140. In some cases, the valve 142 may be operable only in the open and closed positions. However, in other cases, the valve 142 may be commanded to an intermediate position, in which flow is permitted, but in which flow and/or pressure through the offtake 140 is less than in the fully open position.

The pneumatic system 131 further comprises a pair of second main engine core compressor offtakes in the form of low pressure 132 and high pressure 134 cabin bleed offtakes. An optional third, lower pressure cabin bleed offtake may also be provided. Intakes of the cabin bleed offtakes 132, 134 are in fluid communication with a relatively low pressure compressor stage of the main engine 10, such as the IP8 stage (i.e. the $8^{th}$ stage of the intermediate pressure compressor 14), and a relatively high pressure compressor stage of the main engine 10, such as the HP3 or HP6 stage, (i.e. the 3rd or $6^{th}$ stages of the high pressure compressor 16 respectively). In some cases therefore, the first and second compressor offtakes may be in fluid communication with the same compressor stages of the engine 10. However, the cabin and handling bleed offtakes differ in that the engine handling bleeds are controlled by the FADEC on the basis of compressor 14, 16 surge/stall margin, whereas the cabin bleeds are operated to provide a required ECS operating pressure, temperature and flow. In most cases, the engine handling bleed is also dumped overboard, whereas the cabin bleed airflow must be provided to the ECS. Outlets of the offtakes 132, 134 are in fluid communication with an aircraft environmental control system (ECS). The cabin bleed offtakes are also controlled by respective valves 133, 135, which control flow rates and/or pressure from the respective offtakes 132, 134, and are also operable in at least closed and open positions, and also possibly intermediate positions. The valves 133, 135 may be controlled by either the FADEC, or a separate bleed air system controller (not shown). The pneumatic system 131 comprises a turbocompressor 144 comprising a fluid turbine 146 which mechanically drives a fluid compressor 148 via an interconnecting shaft 149.

The turbine 146 is in fluid communication with handling bleed offtake 140 between the main engine compressor 16 and bypass duct 13. When the valve 142 is open, fluid flowing through the turbine 146 drives the turbine to in turn drive the compressor 148. Fluid downstream of the turbine 146 is thereby cooled and reduced in pressure.

The compressor 148 is in fluid communication with at least one of, and preferably both cabin bleeds 132, 134 via a manifold 138. The compressor 148 is located downstream of the main engine compressors 14, 16, and upstream of the ECS. When the compressor 148 is driven, air flowing through the compressor 148 is pressurised, thereby increasing the pressure of the air flowing through the offtake 132, 134 downstream of the compressor 148 relative to air upstream of the compressor 148. Generally, there will only be air flowing through 132 or 134, not both at the same time.

The turbine 146, compressor 148, cabin bleed offtakes 132, 134 and handling bleed offtake 140 are each configured such that the handling bleed offtake 140 provides sufficient energy to the turbine 146 to drive the compressor 148 in use, to thereby raise the pressure of the air flowing through the compressor 148. This is achieved by ensuring that the pressure drop across the turbine 146 and/or mass flow through the turbine 146 are greater than the pressure drop and/or mass flow through the compressor 148. In the described embodiment, this is ensured by providing a handling bleed offtake 140 in fluid communication with a higher pressure stage of the HP compressor 16—however, it may be possible to provide sufficient energy to the turbine 146 from a handling bleed offtake in fluid communication with the same or a lower pressure stage than the cabin bleed offtakes.

An optional bypass arrangement 152 is provided, which comprises a bypass duct 154 and bypass valve 156. An inlet of the bypass duct 156 is located downstream of both the cabin offtakes 132, 134 but upstream of the compressor 148, and an outlet is provided downstream of the compressor 148, such that air flowing through the bypass arrangement 152 passes from the main engine compressors 14, 16 to the ECS without passing through the compressor 148. The bypass 152 can be operated to bypass air around the turbocompressor air compressor 148 by opening the valve 156, and can be operated to direct air through the compressor 148 by closing the valve 156.

A fan air heat exchanger 136 is provided downstream of the compressor 148 and bypass 152, and upstream of the ECS. The heat exchanger 136 exchanges heat between the relatively hot compressed air in the cabin air offtakes 132, 134 and relatively cool fan air in a fan air duct 138. The cooled cabin air is then passed to the ECS, while the warmed fan air is passed to the bypass duct 13.

The valves 133, 135, 142 are operated by the FADEC or bleed air system controller (not shown) to control the pressure and flow rate of the bleed offtake air provided by the offtakes 132, 134 to the ECS and the handling bleed provided by the offtake 140. In some cases, the ECS may comprise a flow control valve (not shown) for controlling the flow rate of air through the ECS. A first method of operation of the pneumatic system 131 is described in FIG. 5. The first method is used where the valves 132, 134, 142 are operable only in open and closed positions, and not in intermediate positions.

Figure 5:
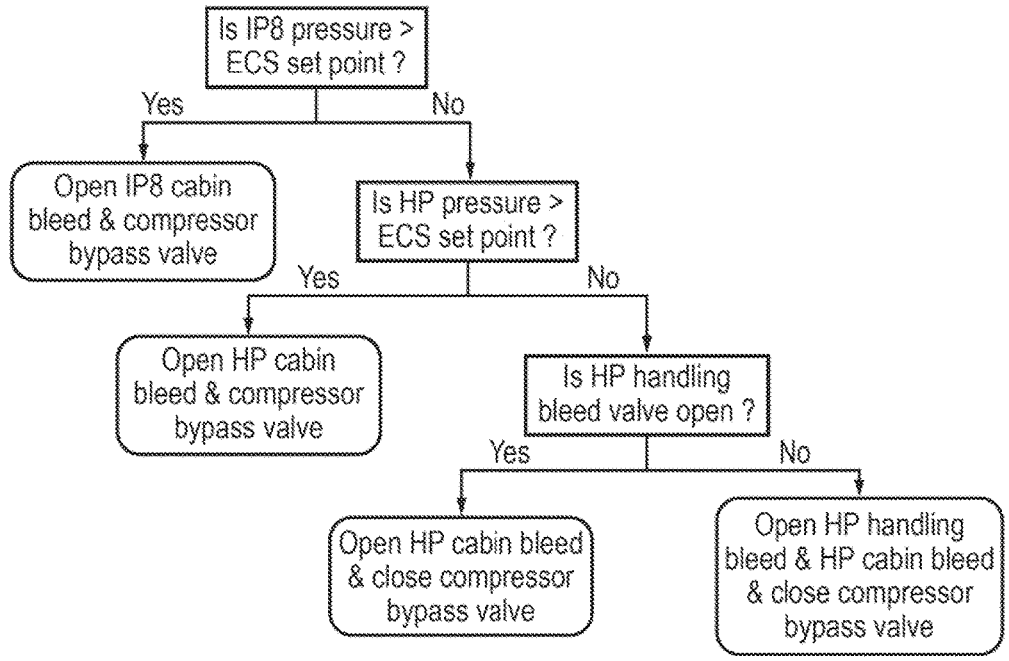
FIG. 5 shows a first method of operating the pneumatic system of FIG. 4.

Referring to FIG. 5, a sensor or engine schedule is used to determine the pressure at the stage in communication with the inlet of the low pressure cabin bleed offtake 132, i.e. the IP8 compressor stage of main engine intermediate compressor 14 in the described embodiment. If the IP8 pressure is determined to be greater than a predetermined value (ECS set point), the valve 133 is commanded to the open position to allow air to flow from the low pressure offtake 132, and the valve 135 is commanded to close, to prevent air from flowing from the high pressure offtake 134. The bypass valve 156 is also commanded to move to the open position, to bypass air around the turbocompressor air compressor 148. The predetermined value is determined by an ECS controller (not shown) in accordance with ECS flow and pressure requirements, or may be a fixed value. The handling bleed valve 142 is operated by the FADEC independently of the cabin bleed valves 133, 135 in accordance with engine schedules, in order to prevent compressor stall or surge. However, in general, where the IP8 pressure is above the predetermined amount (which will usually occur at mid to high engine thrust settings), the handling bleed valve 142 will be closed. Consequently, there will be no flow through the handling bleed offtake 140, and therefore no flow through the turbine 146 during this mode of operation. Consequently, the compressor 148 will not be driven. In this case the compressor 148 will offer a resistance to airflow therethrough, and air will therefore be passed through the bypass 152 where the valve 156 is open. Consequently, the valve 156 could comprise a non-return valve, which is operated by pressure in the cabin bleed offtake 132. Where the compressor 148 is operational, the pressure downstream of the valve 156 will be higher than the pressure upstream of the valve 156, forcing the valve 156 to close, thereby preventing air from bypassing the compressor 148. On the other hand, where the compressor 148 is non-operational, the pressure downstream of the valve 156 will be lower than the pressure upstream of the valve 156, forcing the valve 156 to open, thereby allowing air to bypass the compressor 148.

If the IP8 pressure is determined to be below the ECS set point, then a second determination is made. In the second determination, a sensor or engine schedule (i.e. model of the engine based on measured parameters such as corrected fan rotational speed N1) is used to determine the pressure at the stage in communication with the inlet of the high pressure cabin bleed offtake 134, i.e. the HP3 compressor stage of the high pressure main engine compressor 16. If the HP3 compressor pressure is greater than the ECS set point, the valves 133, 135 are commanded to open the high pressure cabin bleed offtake 134, and close the low pressure offtake 132. Again, the bypass valve 156 is commanded to open, and the handling bleed valve 142 is operated independently. Again, since the engine is still generally at relatively high power, the handling bleed valve 142 is likely to be closed, such that air is directed through the bypass 152. Where the bypass valve 156 is a non-return valve, the non-operation of the compressor 148 ensures that the bypass valve 156 remains open. Of course, where the bypass arrangement 152 is omitted, only the valves 132, 134, 142 are operated.

If the HP3 pressure is determined to be below the ECS set point, a third determination is made. In the third determination, the FADEC determines whether the handling bleed valve 142 is open. If the handling bleed is valve 142 is open, then the high pressure cabin bleed valve 135 is opened, and the valve 133 is closed. The compressor bypass valve 156 is also closed. Consequently, since the handling bleed 142 is open, air will flow through the turbine 146, thereby driving the compressor 148, thereby increasing the pressure provided to the ECS and ensuring the ECS set point pressure is reached. On the other hand, if the handling bleed valve 142 is closed, then the FADEC commands the valve 142 to open, thereby again driving the turbine 146 and hence compressor 148. Therefore sufficient pressure is provided to the ECS regardless of engine operating conditions. Consequently, the ECS operating pressure is no longer a limiting factor in determining the minimum engine thrust during flight (flight idle setting). Consequently, lower flight idle thrust can be selected without risking cabin depressurisation, thereby reducing engine SFC. Alternatively, the high pressure cabin offtake 134 can be provided at a lower pressure stage of the main engine compressor 16, such as at HP3 rather than a higher stage compressor, such as HP6 for example.

Figure 6:
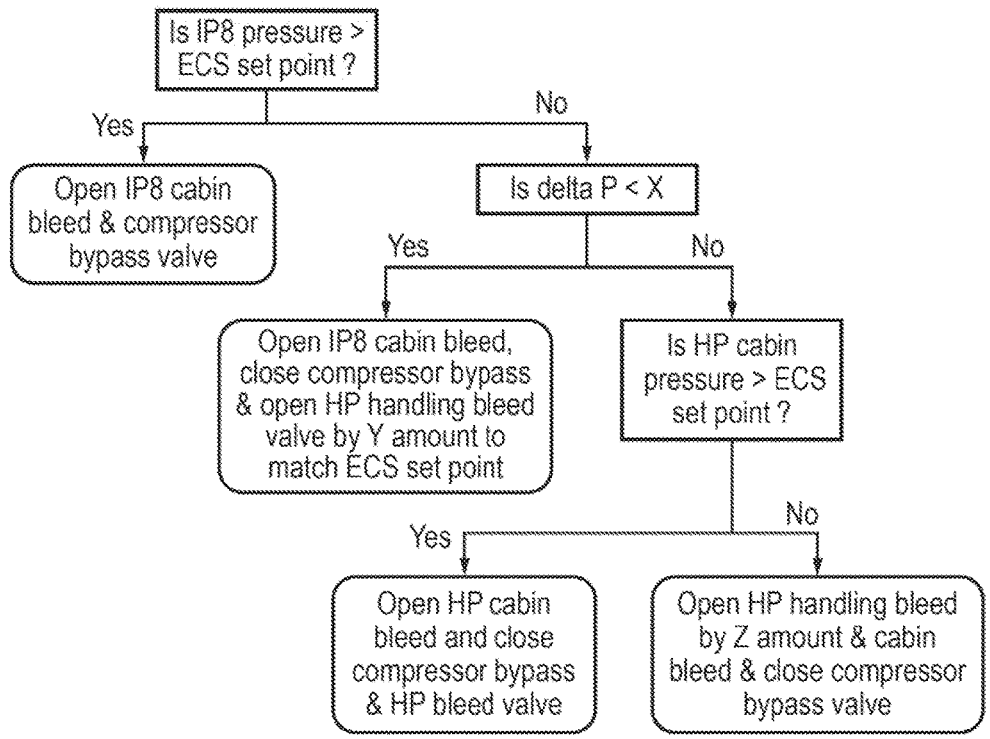
FIG. 6 shows a second method of operating the pneumatic system of FIG. 4.

FIG. 6 shows an alternative operation method for the pneumatic system 131 where the handling bleed valve 142 is operable in intermediate positions between the open and closed positions to regulate the flow and pressure of the handling bleed flow through offtake 140.

A sensor or engine schedule is used to determine the pressure at the stage in communication with the inlet of the low pressure cabin bleed offtake 132, i.e. the IP8 compressor stage of main engine intermediate compressor 14. If the IP8 pressure is determined to be greater than a predetermined value (ECS set point), the valve 133 is commanded to the open position to allow air to flow from the low pressure offtake 132, and the valve 135 is commanded to close the to prevent air from flowing from the high pressure offtake 134. The bypass valve 156 is also commanded to move to the open position, to bypass air around the turbocompressor air compressor 148.

However, if the IP8 pressure is determined to be below the ECS set point, then a second determination is made. The difference between the IP8 pressure and the ECS set point pressure (delta P) is compared to a second predetermined value X. The value X may be determined by experimentation, but is intended to take into account the relative loss in efficiency in operating the relatively high pressure handling bleed offtake 140, compared to the loss in efficiency of operating the high pressure cabin bleed offtake 134 instead of the low pressure cabin bleed offtake 132. In other words, X is determined such that the handling bleed offtake 140 is opened if the loss in efficiency by operating the handling bleed offtake 140 is less than the loss in efficiency of operating the high pressure offtake 134 instead of the low pressure offtake 132. This will be dependent on the relative flows through the respective offtakes 132, 134, 140, and the compressor stages with which they communicate, and the efficiencies of various components, such as the turbocompressor turbine 146 and compressor 148. Of course, the handling bleed offtake 140 is also opened by the FADEC where this is required for compressor surge or stall requirements. If delta P is less than X, then the low pressure cabin bleed valve 133 is opened, the high pressure cabin bleed valve 135 is closed, the bypass valve 156 is closed, and the handling bleed valve 142 is opened an amount "Y", such that the offtake air passed to the ECS matches the ECS set point pressure. Since the handling bleed valve 142 is slightly opened, the turbine 146 is driven, and thus the compressor 148 acts to increase the pressure of air delivered to the ECS. Consequently, the pressure delivered to the ECS can be closely matched to that required, by modulating a single valve. This method thereby results in further improved SFC reductions compared to the first method of operation.

If however delta P is determined to be greater than the second predetermined value X, then a third determination is made. In the third determination, a sensor or engine schedule is used to determine the pressure at the stage in communication with the inlet of the high pressure cabin bleed offtake 134, i.e. the HP3 compressor stage of the high pressure main engine compressor 16. If the HP3 compressor pressure is greater than the ECS set point, the valves 133, 135 are commanded to open the high pressure cabin bleed offtake 134, and close the low pressure offtake 132. Again, the bypass valve 156 is commanded to open, and the handling bleed valve 142 is operated independently. This system provides similar advantages to the system 131, providing improved SFC in most cases. This system is simpler however, thereby reducing costs.

If in the third determination, the HP3 compressor pressure is less than the ECS set point, the low pressure cabin offtake valve 133 is closed, the bypass valve 156 is closed, and the high pressure cabin bleed valve 135 is opened, and the handling bleed valve 142 is opened by an amount "Z" sufficient to increase the pressure delivered to the ECS to the ECS set point, and also an amount sufficient to satisfy compressor operability flow requirements (i.e. to prevent compressor stall/surge). Consequently, the method provides efficient operation of the system 131 over a wide range of conditions.

The system may optionally include a sensor 158 configured to monitor the condition of the compressor 148. The method may comprise opening the bypass valve 156 if the compressor fails, and the valves 132, 134, 142 would then be operated in accordance with a predetermined engine schedule. The system may also further include a sensor 160 configured to monitor the condition of the turbine 146. If the turbine 146 is found to have failed, a different handling bleed valve (not shown) can then be opened to ensure compressor operability.

Figure 7:
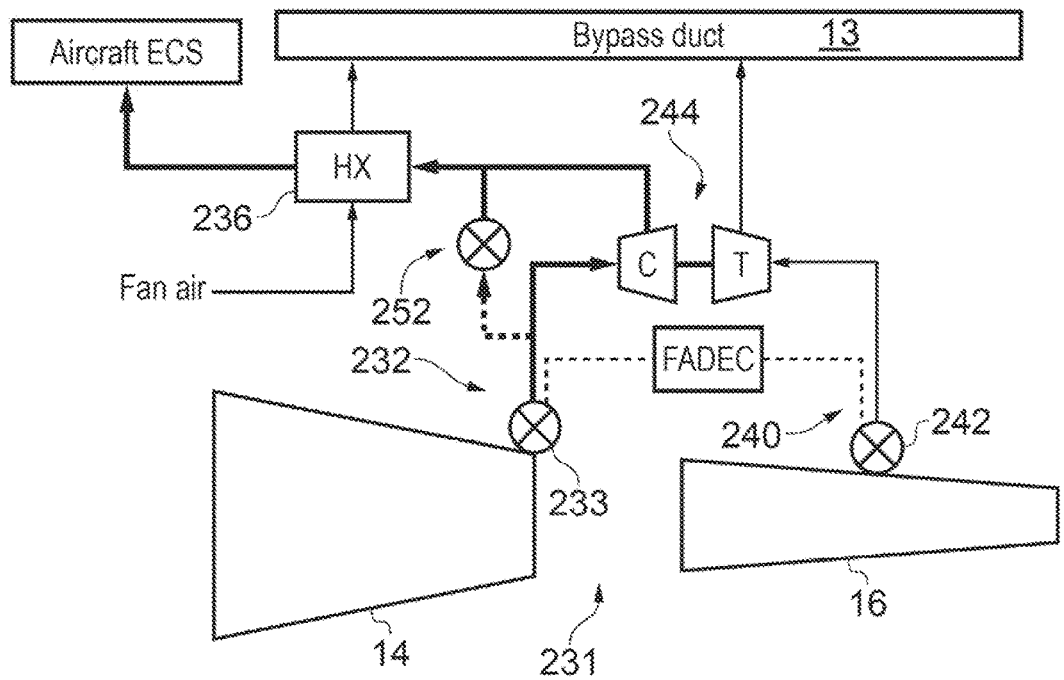
FIG. 7 shows a second pneumatic system in accordance with the present invention.

FIG. 7 shows a second pneumatic system 231. The system 231 is similar to the system 131, except that only a single cabin bleed offtake 232 is provided, having an offtake valve 233. A handling bleed 240, bypass arrangement 252, fan heat exchanger 236 and turbocompressor 244 are also provided. The method of operation is similar to the second method of operation, with the handling bleed valve 242 being modulated to match the ECS set point pressure at the ECS. It is thought that, for some gas turbine engines, the flow from the handling bleed 240 will be sufficient to boost the pressure from the single cabin offtake 232 to provide sufficient pressure to operate the ECS at all engine conditions, including engine idle.

Figure 8:
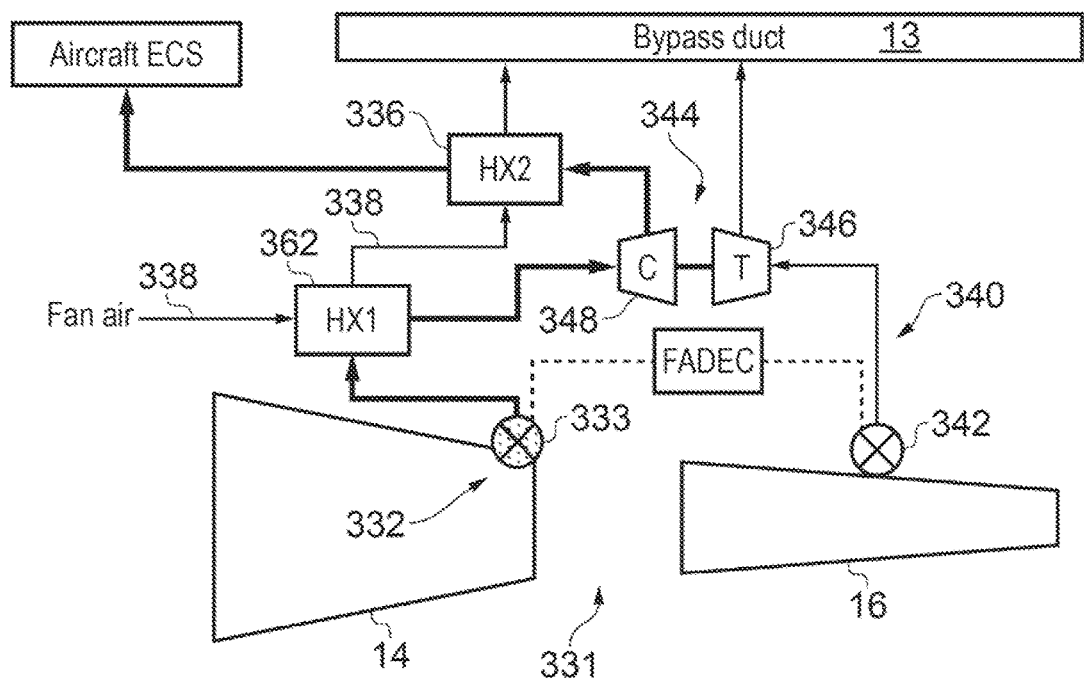
FIG. 8 shows a third pneumatic system in accordance with the present invention.

FIG. 8 shows a third pneumatic system 331. The system is similar to pneumatic system 231, having a single cabin bleed offtake 332 having an offtake valve 333, handling bleed 340, bypass arrangement 352, fan heat exchanger 336 having a fan air duct 338 and turbocompressor 344 having a turbine 346 and compressor 348. The pneumatic system 331 further comprises a second fan heat exchanger 362. The second heat exchanger 362 is also configured to exchange heat between the cabin offtake air and fan air. The exchanger 362 is located in the cabin offtake air fluid path between the compressor 348 of the turbocompressor 344 and the offtake valve 333. The fan air duct 338 extends from an inlet, through the second heat exchanger 362, then through the heat exchanger 336, then to an outlet within the bypass duct 13. Consequently, intercooling is provided to the cabin offtake air both prior to and after compression by the compressor 348. This increased intercooling ensures that the compressor needs to do less work to achieve a given pressure at the ECS, thereby reducing the amount of handling bleed required from bleed 340. Due to the decreased temperature, less cooling may be required in the ECS to satisfy the cabin air flow and temperature requirements. Consequently, this embodiment may still further reduce the engine SFC by reducing handling bleed offtake requirements and/or ECS cooling requirements. However, this embodiment is more complex than other embodiments, requiring a second heat exchanger 362. Similarly, the second heat exchanger could also be added to a pneumatic system having low and high pressure cabin offtakes, such as the system shown in FIG. 4. Due to the presence of the second heat exchanger 362 however, it may be possible to omit the first heat exchanger 336.

Figure 9:
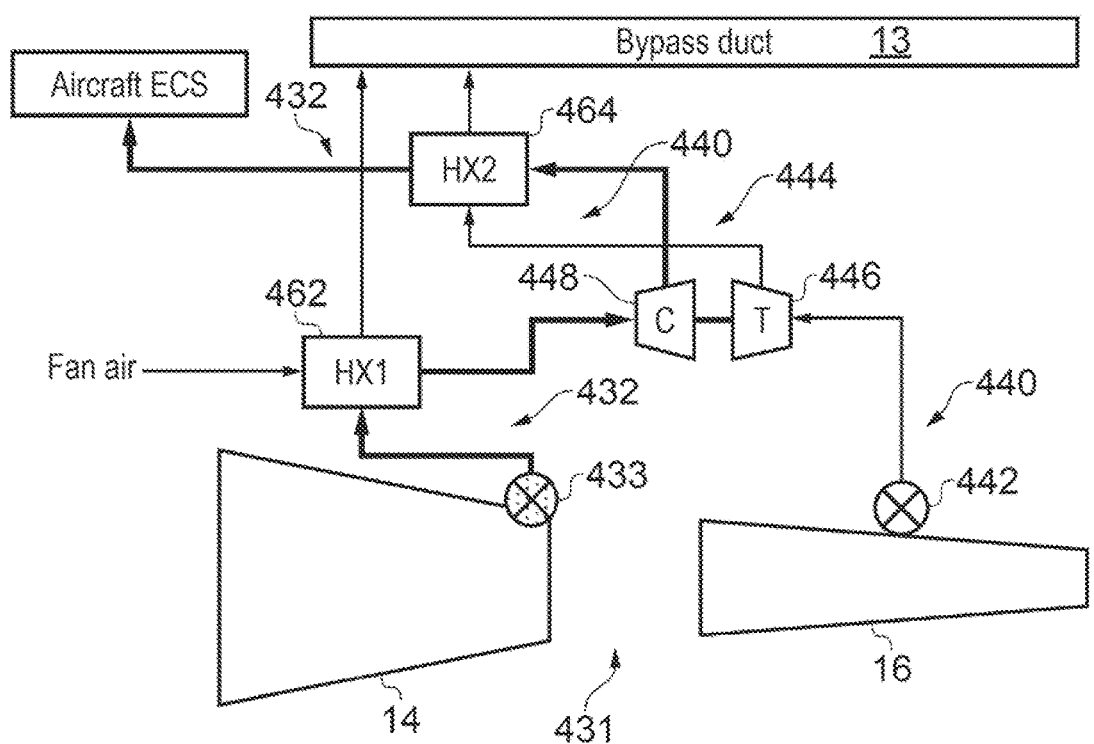
FIG. 9 shows a fourth pneumatic system in accordance with the present invention.

FIG. 9 shows a fourth pneumatic system 431. The system 431 is similar to the system 331, having a single cabin bleed offtake 432 having an offtake valve 433, handling bleed 440, bypass arrangement 452, fan heat exchanger 462 (similar to the second fan heat exchanger 362 of system 331) and turbocompressor 444 having a turbine 446 and compressor 448. However, the first fan heat exchanger downstream of the turbocompressor 444 is omitted, being replaced with a core compressor offtake heat exchanger 464 configured to exchange heat between the first and second core compressor offtake flows. A first side of the heat exchanger 464 is located in the handling bleed offtake fluid path between the turbine 446 and bypass duct 13, and a second side of the heat exchanger 464 is located in the handling bleed offtake fluid path between the compressor 448 and ECS. Consequently, the compressed cabin bleed air is cooled, while the handling bleed offtake efflux is heated before being dumped overboard. Consequently, further heat is extracted from the cabin bleed air before being supplied to the ECS system. Again, the core compressor offtake heat exchanger could be utilised in any of the embodiments of the invention.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

For example, further cabin bleed or engine handling bleed offtakes could be provided. The cabin bleed or engine handling bleeds could be located at different stages of the engine compressor. The engine handling bleed outlet could communicate with the zone three region around the engine core instead of the bypass duct. Alternatively, the first compressor offtake could communicate with the aircraft ECS. Where the first compressor offtake comprises an engine handling bleed offtake, the ECS flow would have to be controlled by the FADEC to ensure compressor operability, i.e. ECS flow would have to be sufficient to prevent compressor stall or surge. Further heat exchangers and/or control valves could be used. The gas turbine engine could be a two spool engine. Different aspects of the different embodiments could be combined as appropriate.

The invention claimed is:

1. A pneumatic system for an aircraft, the aircraft having a gas turbine engine comprising core compressors and a bypass fan, the pneumatic system comprising:
 a turbocompressor comprising an air compressor mechanically driven by an air turbine;
 a handling bleed offtake comprising an engine handling bleed valve that is configured to bleed flow from a first core compressor of the core compressors and that is in fluid communication with the turbocompressor air turbine to drive the air turbine;
 a high pressure cabin bleed offtake that is configured to bleed the flow from the first core compressor of the core compressors and that is in fluid communication with the turbocompressor air compressor such that air from the high pressure cabin bleed offtake is compressed by the turbocompressor air compressor;
 a low pressure cabin bleed offtake configured to bleed flow from a second core compressor of the core compressors; and
 the low pressure cabin bleed offtake comprising a first modulation valve; and
 the high pressure cabin bleed offtake comprising a second modulation valve;
 an electronic engine controller configured to (i) operate the engine handling bleed valve in accordance with a predetermined handling bleed schedule to ensure that the first core compressor of the core compressors does not stall or surge during operation, and (ii) determine whether pressure of the low pressure cabin bleed offtake is above a predetermined value, wherein:
 when the low pressure cabin bleed offtake pressure is above the predetermined value, the electronic engine controller operates the first modulation valve to open the low pressure cabin bleed offtake and the second modulation valve to close the high pressure cabin bleed offtake; and
 when the low pressure cabin bleed offtake pressure is determined not to be above the predetermined value, the engine controller determines whether the engine handling bleed valve is open in accordance with the handling bleed schedule, and
 after the engine handling bleed valve is determined to be open in accordance with the handling bleed schedule, the electronic engine controller further operates the second modulation valve to open the high pressure cabin bleed offtake, and
 after the engine handling bleed valve is determined to be closed in accordance with the handling bleed schedule, the electronic engine controller further operates the second modulation valve to open the high pressure cabin bleed offtake and operates the engine handling bleed valve to open the handling bleed offtake.

2. A system according to claim 1, wherein the engine handling bleed offtake comprises an outlet downstream of the turbocompressor air compressor in fluid communication with a low pressure sink.

3. A system according to claim 1, wherein at least one of the first and second modulation valves are operable in further positions between open and closed positions such that at least one of flow rate and pressure of the respective offtake can be continuously controlled.

4. A system according to claim 1, further comprising a compressor bypass arrangement configured to selectively bypass offtake air of the second core compressor around the turbocompressor air compressor.

5. A system according to claim 1, wherein the low pressure cabin offtake communicates with a first fan air heat exchanger located downstream of the turbocompressor air compressor.

6. A system according to claim 5, wherein the low pressure cabin offtake communicates with a second fan air heat exchanger, which is located upstream of the turbocompressor air compressor.

7. A system according to claim 1, further comprising a core compressor offtake heat exchanger configured to exchange heat between offtake flows of the first and second core compressors.

8. A system according to claim 7, wherein the core compressor offtake heat exchanger is located downstream of the turbocompressor air compressor and air turbine.

9. An aircraft comprising a pneumatic system according to claim 1.

10. A method of operating a pneumatic system for an aircraft, the aircraft having a gas turbine engine comprising core compressors and a bypass fan, the method comprising:
operating, by way of an electronic engine controller, an engine handling bleed valve of the pneumatic system in accordance with a predetermined handling bleed schedule to ensure that a first core compressor of the core compressors does not stall or surge during operation, the handling bleed offtake being configured to bleed flow from the first core compressor and being in fluid communication with a turbocompressor air turbine to drive the turbocompressor air turbine; and
determining by way of the engine controller whether pressure of a low pressure cabin bleed offtake is above a predetermined value, the low pressure cabin bleed offtake being configured to bleed flow from a second core compressor of the core compressors, wherein:
when the low pressure cabin bleed offtake pressure is above the predetermined value, the method further comprises operating a first modulation valve to open the low pressure cabin bleed offtake and a second modulation valve to close a high pressure cabin bleed offtake, the high pressure cabin bleed offtake being configured to bleed flow from the first core compressor and being in fluid communication with a turbocompressor air compressor such that air from the high pressure cabin bleed offtake is compressed by the turbocompressor air compressor; and
when the low pressure cabin bleed offtake pressure is determined not to be above the predetermined value, the engine controller determines whether the engine handling bleed valve is open in accordance with the handling bleed schedule; and
ater the engine handling valves determined to be open in accordance with the handling bleed schedule, the engine controller further operates the second modulation valve to open the high pressure cabin bleed offtake, and
after the engine handling bleed valve is determined to be closed in accordance with the handling bleed schedule, the engine controller further operates the second modulation valve to open the high pressure cabin breed offtake and operates the engine handling bleed valve to open the handling bleed offtake.

11. A method according to claim 10, wherein:
the pneumatic system comprises a compressor bypass arrangement configured to selectively bypass offtake air of the second core compressor around the turbocompressor air compressor,
when the lower pressure cabin bleed offtake pressure is above the predetermined value, the method further comprises operating the compressor bypass arrangement to bypass the low pressure cabin bleed air flow around the turbocompressor air compressor, and
when the low pressure cabin bleed offtake pressure is not above the predetermined value, the method further comprises operating the compressor bypass arrangement to pass the low pressure cabin bleed air flow through the turbocompressor air compressor.

12. A method according to claim 10, wherein:
the valve for the handling Need offtake is configured to be operable ire (i) a closed position, in which flow from the handling bleed offtake is substantially stopped, (ii) an open position, in which flow is permitted from the handling bleed offtake, and (iii) further positions between the open and closed positions such that at least one of the flow rate and pressure of the handling bleed offtake, can be continuously controlled, and
the method further comprises operating the engine handling bleed valve such that cabin bleed flow pressure downstream of the turbocompressor air compressor is above the predetermined value.

* * * * *